L. ADLER.
ELECTRIC WIRE CONDUIT FOR BUILDINGS.
APPLICATION FILED APR. 23, 1913.
1,121,444. Patented Dec. 15, 1914.
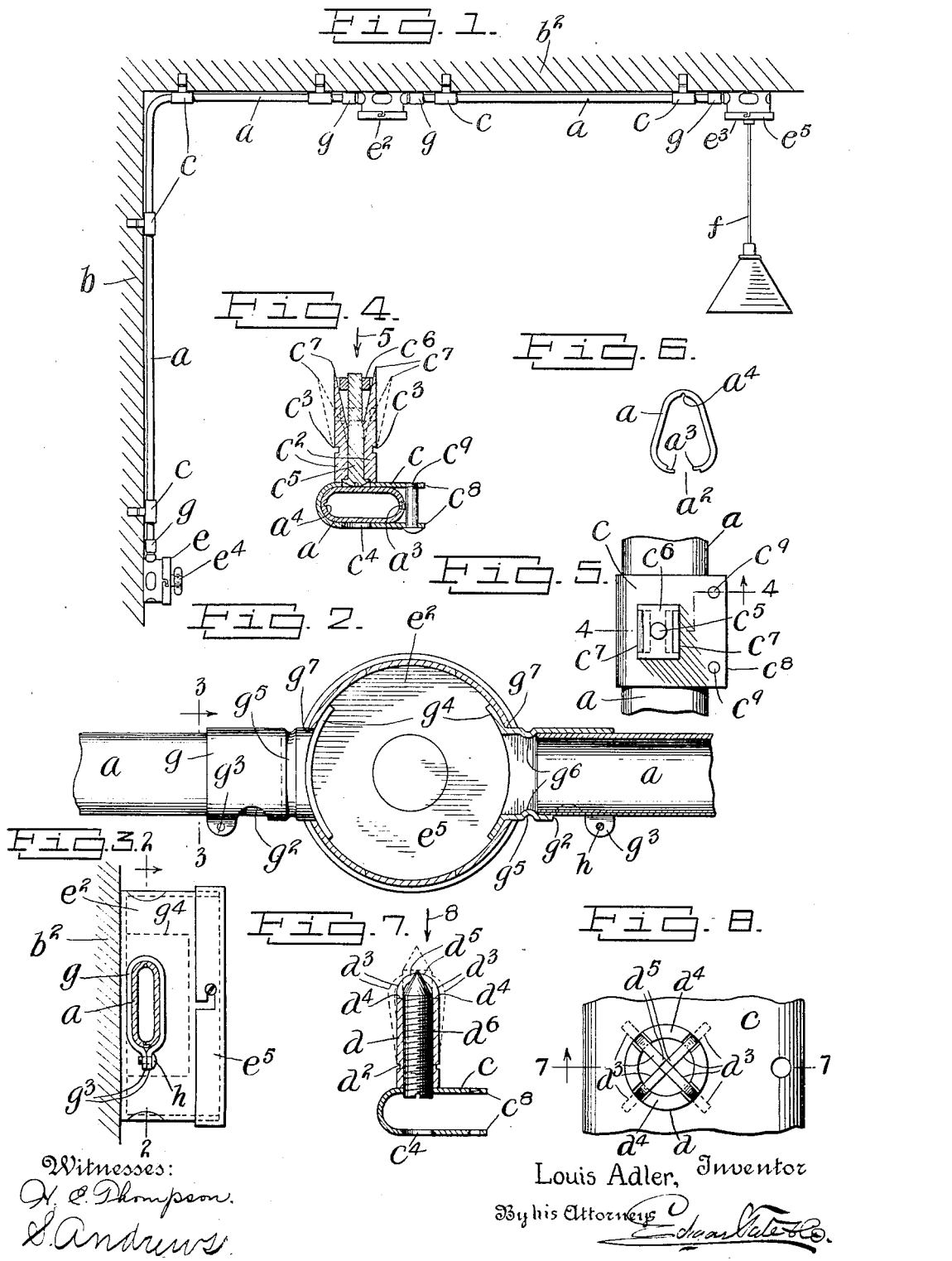
Witnesses:
H. C. Thompson
S. Andrews
Louis Adler, Inventor
By his Attorneys

UNITED STATES PATENT OFFICE.

LOUIS ADLER, OF NEW YORK, N. Y.

ELECTRIC-WIRE CONDUIT FOR BUILDINGS.

1,121,444.   Specification of Letters Patent.   Patented Dec. 15, 1914.

Application filed April 23, 1913. Serial No. 763,013.

*To all whom it may concern:*

Be it known that I, LOUIS ADLER, a citizen of the United States, and residing at New York, in the county of New York and State of New York, have invented certain new and useful Improvements in Electric-Wire Conduits for Buildings, of which the following is a specification, such as will enable those skilled in the art to which it appertains to make and use the same.

This invention relates to electric wire conduits and appliances for buildings, and the object thereof is to provide an improved conduit of this class and improved means for securing the same to the inner walls and ceilings of buildings of any kind or class; a further object being to provide a conduit of the class specified which, instead of being circular in cross section, is oblong or elliptical and presents a better appearance and is easier to install and more perfect mechanically and electrically when secured in position, than a conduit of circular form in cross section, a further object being to provide a conduit of the class specified which is made of sheet metal and open longitudinally at one side so that electric wires can be dropped thereinto and the conduit closed in the operation of securing the same to a wall or ceiling, or other support, the means employed for securing the conduit to a wall or other support being also adapted to close the conduit or the longitudinal opening therein.

My invention also involves an improved form of junction or outlet box designed particularly for use in connection with my improved conduit or conduits, and said invention is fully disclosed in the following specification of which the accompanying drawing forms a part, in which the separate parts of my improvement are designated by suitable reference characters in each of the views, and in which:—

Figure 1 is a view showing my improved conduit, junction boxes, and the method of, or means for, securing the same to the walls of a building;—Fig. 2 a transverse sectional view through one of the junction boxes and showing the method of connecting a conduit therewith, and on the line 2—2 of Fig. 3;—Fig. 3 a section on the line 3—3 of Fig. 2;—Fig. 4 a section through a conduit bracket or support which I employ, the section being on the line 4—4 of Fig. 5, and showing the means for securing the bracket or support to a wall;—Fig. 5 a plan view of the construction shown in Fig. 4 and looking in the direction of the arrow 5;—Fig. 6 an end view of one of my improved conduits and showing it open;—Fig. 7 a view similar to Fig. 4 of a bracket or support but showing a modified means for securing the bracket or support to a wall; and;—Fig. 8 a plan view of the construction shown in Fig. 7 and looking in the direction of the arrow 8.

In the practice of my invention, I provide a conduit $a$ which is composed of sheet metal and is oblong or elliptical in cross section and open longitudinally at one of its narrower sides, as shown at $a^2$. The conduit $a$ at its open side is provided with overlapping flanges $a^3$, and opposite said flanges or said open side, and in the interior surfaces thereof is a longitudinal groove $a^4$ which weakens said conduit so that the side portions thereof may be easily opened and closed. For the purpose of connecting the conduit $a$ with a wall $b$ and ceiling $b^2$, or other support, I provide U-shaped brackets $c$ also composed of sheet metal and one of which is shown in Figs. 4 and 5, and a modified form in Figs. 7 and 8.

The bracket $c$, shown in Figs. 4 and 5, is provided at one side with projecting lock plates or members $c^2$ the free ends of which are tapered on their inner sides, and said lock plates or members are provided in their outer sides at a predetermined point from the side of the U-shaped bracket $c$ with transverse recesses $c^3$ which enable the free end portions thereof to be bent outwardly, as shown in dotted lines. The side of the U-shaped bracket $c$, opposite that with which the lock plates or members $c^2$ are connected, is provided with an aperture $c^4$, and in practice, a screw $c^5$ is passed through the aperture $c^4$ and through a corresponding aperture in the opposite side of the bracket $c$ and out between the lock plates or members $c^2$, and a nut $c^6$ is mounted on the end of said screw. The nut $c^6$ is preferably rectangular in form, as clearly shown in Fig. 5, and the opposite sides thereof are preferably recessed to receive the tapered end portions $c^7$ of the lock plates or members $c^2$, and by turning the screw $c^5$ by means of a suitable instrument passed through the apertures $c^4$, the nut $c^6$ may be drawn inwardly and the end portions $c^7$ of the lock plates or members $c^2$ expanded.

In the use of fastening devices of this class, the wall $b$ is provided with recesses to receive locking parts of the bracket or brackets $c$, which locking parts are inserted into said recesses after which the screws $c^5$ are turned so as to expand the lock plates or members $c^2$, and in this way the bracket or brackets are secured to the wall or support after which the conduit or conduits $a$ are dropped thereinto. After the bracket or brackets have been secured to the wall and ceiling, or other support, in the manner shown and described, the conduit or conduits $a$ are dropped thereinto, after which the wires, cables or conduits may be dropped thereinto, and the side portions $c^8$ of the U-shaped brackets are drawn together and secured together by passing a screw or screws $c^9$ therethrough, which operation draws the side portions of the brackets together and also draws the side portions of the conduit or conduits together, as clearly shown in Fig. 4.

The bracket shown in Figs. 7 and 8 is exactly the same, as shown in Figs. 4 and 5, but the means for securing said bracket to the wall are different and are specially designed for use in connection with plaster, concrete, or similar walls and ceilings. In this form of construction, I secure to one side of the U-shaped bracket, as shown, a short tube $d$ preferably provided adjacent to the bracket with an annular groove $d^2$, and the said tube is slotted longitudinally at four different points to form tongues $d^3$, and the ends of the tube $d$ are cut off between said tongues, as shown at $d^4$, and the end portions of said tongues are curved inwardly, as shown at $d^5$, and in practice, a screw $d^6$ is used in the same manner as the screw $c^5$ in Fig. 4 to extend the tongues $d^3$, as shown in dotted lines in Fig. 7, for the purpose of securing the U-shaped brackets to the wall.

My invention also involves junction boxes having three different styles of covers which are shown in Fig. 1 at $e$, $e^2$ and $e^3$. The junction box at $e$ is an ordinary inlet box having a switch cover device $e^4$, and that at $e^2$ an ordinary branch junction box, while that shown at $e^3$ has a socket junction box cover, and the box $e$ is secured to the wall $b$, while the boxes $e^2$ and $e^3$ are secured to a ceiling, and suspended from the box $e^3$ is a flexible hanger $f$ for supporting an electric light, but my invention is not limited to any particular arrangement of the junction boxes.

One of the junction boxes, that shown at $e^2$, is shown in section in Fig. 2, and is provided at its opposite sides with couplings $g$ with which the conduit or conduits $a$ may be connected and two of said conduits are shown so connected.

The couplings $g$ are open at one side for a part of their lengths, as shown at $g^2$, and are provided with ears $g^3$, and said couplings are provided at one end with flanges $g^4$ adjacent to which are annular grooves $g^5$ forming corresponding ribs $g^6$ on the inner sides of said couplings.

The junction boxes are provided with detachable covers $e^5$ the style of which will depend on the location, object and use of the boxes, and in practice, the couplings $g$ are inserted into the boxes and passed outwardly through apertures $g^7$ in the side walls thereof, which apertures are formed by breaking out or removing the "knockouts" with which the boxes are provided, and in this operation the flanges $g^4$ fit on the inner sides of the side walls of the boxes, and in practice, the conduits $a$ are dropped into the open couplings $g$ and moved inwardly so that the ends thereof abut against the ribs $g^6$ after which the said conduits are secured in said couplings by passing screws or bolts $h$ through the ears $g^3$.

The conduit or conduits $a$, the U-shaped brackets $c$ and the couplings $g$ are preferably composed of sheet metal and possess more or less elasticity, but other material may be employed, if desired.

My improved junction box or boxes may be used as a branch off box to mount any standard fitting, such as a "receptacle," as a snap switch attachment, plug or socket, or as an outlet box for hanging or suspending any kind of a fixture, or as a rosette for a cord drop light, all of which uses are rendered possible by means of the different styles of covers for the boxes, which are, or may be provided, said covers being detachable and interchangeable.

Having fully described my invention what I claim as new and desire to secure by Letters Patent is;—

1. The herein described devices for use in electrically wiring a building, comprising conduits composed of flexible material and oblong or elliptical in cross section and open longitudinally of one of their narrower sides, U-shaped brackets composed of flexible material and adapted to receive said conduits, means for drawing and securing the sides of the U-shaped brackets together so as to compress the conduits therein and close the longitudinal opening in one side thereof, and means for securing said brackets to a wall or other support.

2. The herein described device for use in electrically wiring a building comprising conduits of flexible material and of greater diameter in one direction than the other and open longitudinally of one of their narrower sides, and attaching devices adapted to be secured to or in a wall or other support and having U-shaped members composed of flexible material and adapted to receive said conduits, and means for drawing and securing the sides of the U-shaped members together so as to compress the conduits therein and close the longitudinal opening in one side thereof.

In testimony that I claim the foregoing as my invention I have signed my name in presence of the subscribing witnesses this 19th day of April 1913.

LOUIS ADLER.

Witnesses:
C. MULREANY,
S. ANDREWS.